(12) United States Patent
Kulkarni et al.

(10) Patent No.: US 7,696,299 B2
(45) Date of Patent: Apr. 13, 2010

(54) FAST CRYSTALLIZING MODIFIED POLYETHYLENE NAPHTHALATE

(75) Inventors: Sanjay Tammaji Kulkarni, Chennai (IN); Balasundaram Dilly Raj, Chennai (IN)

(73) Assignee: Futura Polyesters Limited, Chennai (IN)

( * ) Notice: Subject to any disclaimer, the term of this patent is extended or adjusted under 35 U.S.C. 154(b) by 253 days.

(21) Appl. No.: 11/706,138

(22) Filed: Feb. 13, 2007

(65) Prior Publication Data

US 2007/0203324 A1    Aug. 30, 2007

(30) Foreign Application Priority Data

Feb. 21, 2006    (IN)    .................. 248/MUM/2006

(51) Int. Cl.
*C08G 63/00*    (2006.01)
(52) U.S. Cl. ........................... 528/274; 528/272
(58) Field of Classification Search .............. 528/272
See application file for complete search history.

(56) References Cited

U.S. PATENT DOCUMENTS

| | | | |
|---|---|---|---|
| 4,798,883 A | 1/1989 | Tung et al. | 528/272 |
| 4,963,644 A | 10/1990 | Duh | 528/272 |
| 5,157,168 A * | 10/1992 | Wilmott et al. | 568/877 |
| 5,356,972 A * | 10/1994 | Sperling et al. | 524/313 |
| 5,391,694 A | 2/1995 | Duh et al. | 528/272 |
| 5,412,063 A | 5/1995 | Duh et al. | 528/272 |
| 5,523,361 A | 6/1996 | Tung et al. | 525/439 |
| 5,594,092 A | 1/1997 | Burkett et al. | 528/272 |
| 5,612,423 A | 3/1997 | Burkett et al. | 525/444 |
| 5,714,571 A * | 2/1998 | Al Ghatta et al. | 528/308.2 |
| 5,723,520 A * | 3/1998 | Akkapeddi et al. | 523/455 |
| 5,744,578 A | 4/1998 | Duh | 528/492 |
| 5,750,644 A | 5/1998 | Duh | 528/481 |
| 5,895,807 A | 4/1999 | Galko et al. | 525/444 |
| 6,124,423 A | 9/2000 | Duh et al. | 528/298 |
| 6,300,462 B1 * | 10/2001 | Cliffton et al. | 528/272 |
| 6,663,961 B2 * | 12/2003 | Cho et al. | 428/402 |
| 6,749,785 B2 | 6/2004 | Subramanian et al. | 264/173.16 |
| 2002/0168509 A1 * | 11/2002 | DeSimone et al. | 428/310.5 |

* cited by examiner

*Primary Examiner*—Randy Gulakowski
*Assistant Examiner*—Shane Fang
(74) *Attorney, Agent, or Firm*—Lucas & Mercanti, LLP

(57) ABSTRACT

The invention relates to modified Polyethylene Naphthalate (PEN) polymers with fast crystallizing properties, which helps in crystallization of amorphous PEN resin prior to its solid state polymerization (SSP).

31 Claims, 2 Drawing Sheets

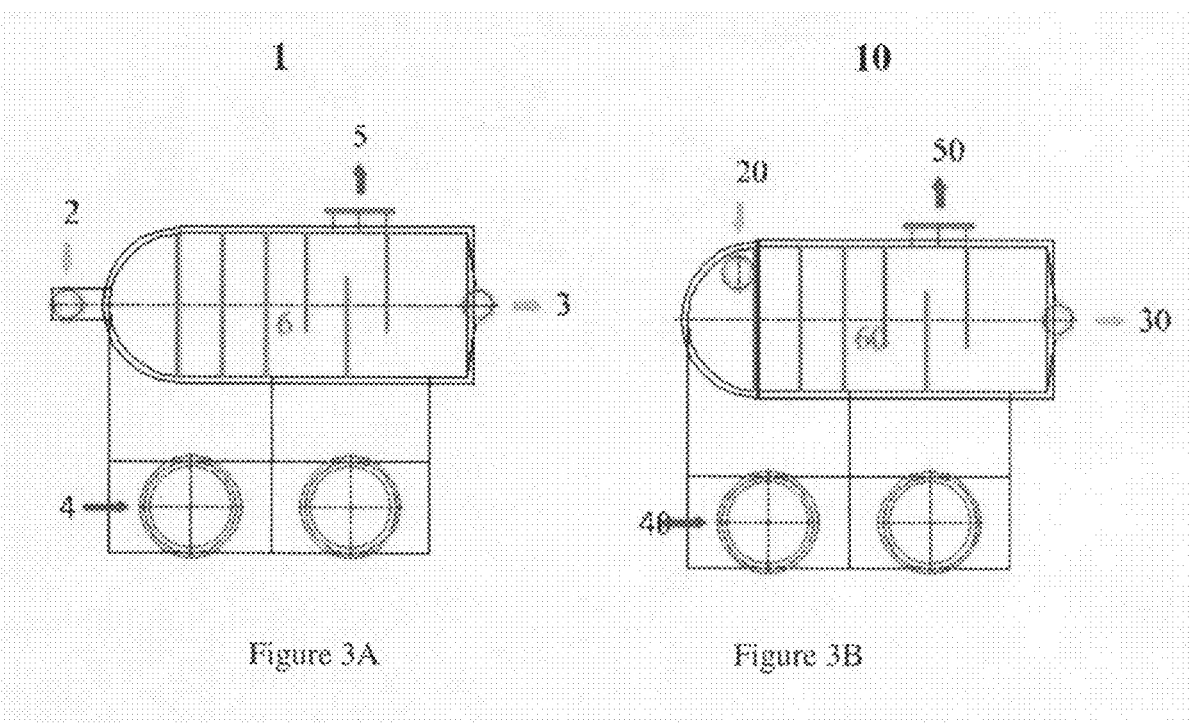

FAST CRYSTALLIZING MODIFIED POLYETHYLENE NAPHTHALATE

CROSS REFERENCE TO RELATED APPLICATIONS

This application claims the benefit of Indian Provisional Application Serial No. 248/MUM/2006, filed on Feb. 21, 2006, which is hereby incorporated by reference in its entirety.

FIELD OF THE INVENTION

The invention relates to modified Polyethylene Naphthalate (PEN) polymers with fast crystallizing properties, which helps in crystallization of amorphous PEN resin prior to its solid state polymerization (SSP).

BACKGROUND OF THE INVENTION

Polyethylene naphthalate (PEN) is a naphthalate-based polyester that is used in the production of fiber, film and rigid packaging applications. Like most thermoplastic polyesters, PEN is also produced by melt phase polymerization, which gives the amorphous polymer a medium intrinsic viscosity (I.V.). To increase the I.V., amorphous PEN chips are crystallized and then subjected to solid state polymerization (SSP). The pre-crystallization process used for the related polyester polyethylene terephthalate (PET) cannot be used for PEN because of the differences in their physical and chemical properties. For example, PEN's Tg is about 120° C., its melting point, Tm, is about 270° C., and its softening point or sticking temperature is in the range of about 140° C. to about 150° C. Hence, the crystallization temperature used for PEN is normally in the range of about 180° C. to about 220° C., which is much higher than that used for PET, wherein PEN chips undergo a sticky stage when they cross the softening point or sticking temperature. To avoid sticking or lumping of PEN chips, agitated vessels or fluidized beds are used.

Several methods have been adopted to precrystallize amorphous PEN before it is subjected to SSP.

U.S. Pat. No. 4,798,883 describes a modified PEN process with enhanced crystallization characteristics of amorphous PEN by the addition of small amount of polyether glycols such as polytetramethylene glycol and polyethylene glycol.

U.S. Pat. No. 4,963,644 describes precrystallization of amorphous PEN prepolymer which comprises: (1) heating the amorphous PEN prepolymer to a temperature that is within the range of about 80° C. to about 140° C. in the presence of a stream of an inert gas or under a vacuum to devolatilize the amorphous PEN prepolymer; and (2) subsequently heating the devolatilized PEN prepolymer to a temperature within the range of about 150° C. to about 260° C. while providing agitation to produce crystallized PEN prepolymer. The precrystallized PEN prepolymer is subsequently subjected to SSP by heating it to a temperature of about 50° C. to about 1° C. below its sticking temperature for a period of time sufficient to produce the high molecular weight PEN resin.

U.S. Pat. No. 5,412,063 describes the manufacture of PET and PEN chips wherein the amorphous strands have a hole in the middle. The chips do not need any special precrystallization procedure, such as devolatilization, prior to SSP.

U.S. Pat. No. 5,523,361 describes a precrystallization procedure for PEN involving coating the amorphous PEN chips with ethylene carbonate, which avoids the devolatilization procedure before SSP.

U.S. Pat. Nos. 5,744,578 and 5,750,644 describe processes for the crystallization of a PEN prepolymer containing volatile components. The temperature is maintained in the range of about 20° C. above the Tg and about 10° C. below the Tm while the PEN prepolymer is agitated. The PEN prepolymer is present as chips or pellets. The crystallization is performed in the presence of a liquid or a mixture of liquids that do not degrade the polymer during crystallization. The liquid or liquids employed may be those whose vapor pressure at the amorphous PEN softening temperature is insufficient to forestall expansion of the pellets. When this class of liquid or liquids is employed, the crystallization vessel is pressurized with an inert gas, including air, to prevent prepolymer expansion. If the liquid or liquids possess sufficiently high vapor pressures at the PEN softening temperature, the pellets do not expand even without the inert air pressurization, thereby avoiding deformation of the PEN chips during crystallization.

U.S. Pat. No. 6,124,423 describes a PEN copolymer process wherein the devolatilization prior to SSP can be avoided by modifying the PEN with diethylene glycol (DEG). Crystallizing the PEN copolymer solids by heating the solids to at least their sticking temperature at an average rate of at least 10° C./minute, to form agglomerate-free crystallized solids. The process may be performed under agitation. The pellets heated up during the crystallization step do not agglomerate or suddenly expand as the temperature rises to and through the sticking temperature of the PEN copolymers. The process allows one to rapidly heat up PEN during crystallization, and do so without conducting a prior drying step or devolatilization step.

All the above precrystallization procedures prior to SSP are cumbersome and involve invariably more than one stage of precrystallization, thereby risking deterioration in quality.

A need therefore exists for a simpler crystallization procedure that uses only a single stage of crystallization.

SUMMARY OF THE INVENTION

The present invention provides processes for making amorphous polyethylene naphthalate (PEN) polymer by melt phase polymerization and the crystallization of the amorphous PEN by a single stage method.

In one aspect, the invention provides a rapidly crystallized amorphous polyethylene naphthalate (PEN) polymer comprising an I.V. of about 0.6 dL/g with a carboxyl end group number of about 18 meq/kg and a Tch of about 195° C.

In another aspect, the invention provides methods of making a polyethylene naphthalate (PEN) polymer that rapidly crystallizes. The method comprises the steps of: (a) transesterifying dimethyl 2,6-naphthalene dicarboxylate (NDC) in the presence of (i) monoethylene glycol (MEG); (ii) at least one transesterification catalyst; and (iii) at least one nucleating agent, wherein about 80% of the transesterifying step is carried out at about 1050 mbar followed by about 20% of the transesterifying step being carried out at about 500 mbar, to form a prepolymer; and (b) polymerizing the prepolymer at about 250° C. to about 305° C. in the presence of a polymerization catalyst and at least one thermal stabilizer. The molar ratio of NDC:MEG is about 1:1.5 to about 1:2.5, preferably about 1:1.5 to about 1:2.1.

In an embodiment, the transesterifying step is carried out by progressively increasing the temperature from about 140° C. to about 255° C. for about 180 minutes to about 300 minutes.

The transesterification catalyst is a compound comprising manganese, calcium, zinc, cobalt, antimony, titanium, tin, or a combination thereof.

Nucleating agents are also added to increase the rate of crystallization of the amorphous PEN. The nucleating agent is a sodium, a sorbitol, or a nano particle containing compound.

In an embodiment, the transesterifying step further comprises the addition of a color agent, such as a cobalt compound.

In an embodiment, the polymerizing step is carried out at about 240° C. to about 285° C. in the initial stage of the reaction and about 285° C. to about 305° C. in the later stage of the reaction at a pressure of about 2 mbar to complete vacuum. These results in faster I.V. build up, and lower melt viscosity, for easy removal from the reactor in a shorter time, preventing degradation and controlling color.

The polymerization catalyst is a compound comprising antimony, titanium, tin, or a combination thereof.

The thermal stabilizer is Triethylphosphonoacetate (TEPA), orthophosphoric acid (OPA), or a combination thereof.

In another embodiment of the methods of the invention, ethylene acrylic acid sodium ionomer (AClyn® 285, Honeywell, Morristown, N.J.) is added as a nucleating agent after polymerization.

In another embodiment, a thermal stabilizer is added after the transesterifying step.

The methods of the invention further comprise the step of extruding the PEN melt into strands in water and then cutting them into chips.

Prior to SSP the amorphous PEN chips are crystallized by a unique and simple stage process. This crystallization procedure does not require a devolatilization step as described in prior art patents. Due to the presence of nucleating agents, a single stage crystallization can be done at a higher temperature between about 190° C. and about 230° C., compared to the usual temperature of less than 160° C. when devolatilization is required. In another embodiment, the methods of the invention comprise placing chips in a fluid bed crystallizer at about 190° C. to about 230° C. to form precrystallized chips.

In another embodiment, the methods of the invention further comprise the step of subjecting the precrystallized chips to SSP at about 240° C. to about 260° C. initially in the presence of nitrogen, for about 3 to about 5 hours, then releasing nitrogen pressure gradually and maintaining a fine vacuum till required I.V. is attained.

In another aspect, the methods of the invention provide an amorphous polyethylene naphthalate (PEN) polymer.

BRIEF DESCRIPTION OF THE DRAWINGS

The foregoing and other objects, features and advantages of the present invention, as well as the invention itself, will be more fully understood from the following description of preferred embodiments when read together with the accompanying drawings, in which:

FIG. 3A provides a top view of a precrystallizer for precrystallization of the PEN resin according to an embodiment of the invention.

FIG. 3B provides a top view of a modified precrystallizer for precrystallization of the PEN resin according to an embodiment of the invention.

DETAILED DESCRIPTION OF THE INVENTION

Figure 1A:
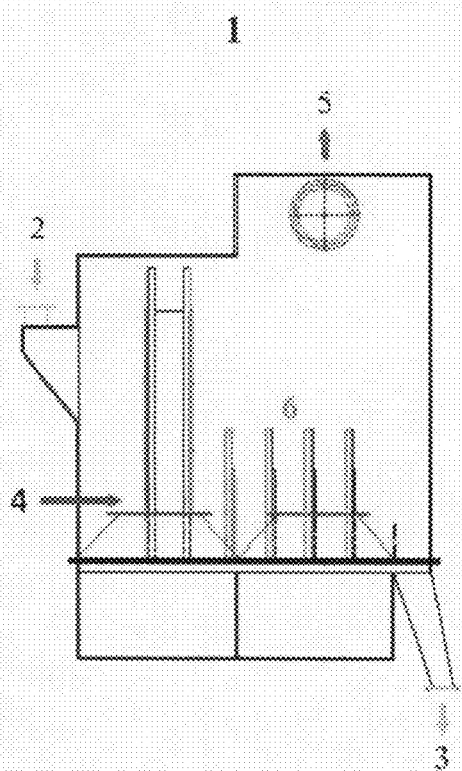
FIG. 1A provides a front view of a precrystallizer for precrystallization of the PEN resin according to an embodiment of the invention.

The invention provides compositions of and methods of making a polyethylene naphthalate (PEN) polymer that rapidly crystallizes. The method comprises the steps of: (a) transesterifying dimethyl 2,6-naphthalene dicarboxylate (NDC) in the presence of (i) monoethylene glycol (MEG); (ii) at least one transesterification catalyst; and (iii) at least one nucleating agent, wherein about 80% of the transesterifying step is carried out at about 1050 mbar followed by about 20% of the transesterifying step being carried out at about 500 mbar, to form a prepolymer; and (b) polymerizing the prepolymer at about 250° C. to about 305° C. in the presence of a polymerization catalyst and at least one thermal stabilizer. The molar ratio of NDC:MEG is about 1:1.5 to about 1:2.5, preferably about 1:1.5 to about 1:2.1.

In an embodiment, the transesterifying step is carried out by progressively increasing the temperature from about 140° C. to about 255° C. In another embodiment, about 80% of the transesterifying step is carried out at atmospheric pressure. In another embodiment, about 20% of transesterifying step is carried out by decreasing the pressure to about 500 mbar. In another embodiment, about 80% of the transesterifying step is carried out at about 1050 mbar followed by about 20% of the transesterifying step being carried out at about 500 mbar at a temperature of about 230° C. to about 255° C. The transesterifying step is carried out for about 180 minutes to about 300 minutes.

In an embodiment, the transesterification catalyst is manganese acetate, titanium acetate, calcium acetate, zinc acetate, antimony trioxide, antimony triacetate, cobalt acetate, tin oxide, or a combination thereof. Manganese acetate (as Mn) is added at about 30 ppm to about 200 ppm, preferably about 35 ppm to about 150 ppm.

In an embodiment, the transesterification catalyst is added at the start of the transesterifying step. In another embodiment, a portion of the transesterification catalyst is added at the start of the transesterifying step and the remaining portion in the middle of the transesterifying step.

In an embodiment of the invention, methanol is removed during the transesterifying step.

The nucleating agent may be sodium acetate, sodium benzoate, nano clay, nano particles, micronized sorbitol, sodium salicylates, nyacol, sodium sorbitrate, nano silica, tungsten trioxide, 3,5-di-t-butyl-4-hydroxyphenyl propionic acid methyl ester, ethylene acrylic acid sodium ionomer, or a combination thereof.

The nucleating agent is generally added in the range of about 10 ppm to about 4000 ppm. Sodium acetate is added at about 2 ppm to about 200 ppm, preferably about 10 ppm to about 150 ppm. Sodium benzoate is added at about 100 ppm to about 1000 ppm, preferably about 200 ppm to about 800 ppm. Nano clay is added at about 100 ppm to about 3000 ppm. Nyacol is added at about 1000 ppm to about 4000 ppm, preferably about 2500 ppm to about 3000 ppm.

In an embodiment, the transesterifying step further comprises the addition of a color agent, such as cobalt acetate, 8,9,10,11-Tetrachloro-12H-phthaloperin-12-one (Red Toner), 1,4-Bis(mesitylamino)anthraquinone (Blue Toner), or a combination thereof. The cobalt compound is added as Co at about 10 ppm to about 80 ppm, preferably about 20 ppm to about 60 ppm.

In an embodiment, the polymerizing step is carried out at about 285° C. in the initial stage of the reaction and at about 300° C. to about 305° C. at a later stage of the reaction at about 2 mbar to complete vacuum. The initial stage is about 40 minutes to about 70 minutes. The final stage is about 15 minutes to about 30 minutes. In another embodiment, the polymerizing step is carried out by gradually increasing the temperature from about 250° C. to about 305° C. and decreasing the pressure from about 500 mbar to about 2 mbar. In an embodiment, the polymerizing cycle is carried out for about 55 minutes to about 100 minutes, preferably about 100 minutes.

The polymerization catalyst is antimony trioxide, tetra-n-butyl titanate (TnBT), butylstannoic acid, or a combination thereof. Antimony trioxide (as Sb) is added at about 150 ppm to about 300 ppm, preferably about 180 ppm to about 250 ppm. In another embodiment, antimony, germanium, titanium and tin are added as polymerization catalysts.

The thermal stabilizer is Triethylphosphonoacetate (TEPA), orthophosphoric acid (OPA), or a combination thereof. In an embodiment, the thermal stabilizer is added after the transesterifying step. The thermal stabilizer is added at about 40 ppm to about 200 ppm, preferably about 60 ppm to about 150 ppm.

In another embodiment of the methods of the invention, Aclyn 285 is added as a nucleating agent after polymerization.

The methods of the invention further comprise the step of extruding the PEN melt into strands in water and then cutting them into chips.

Figure 1B:
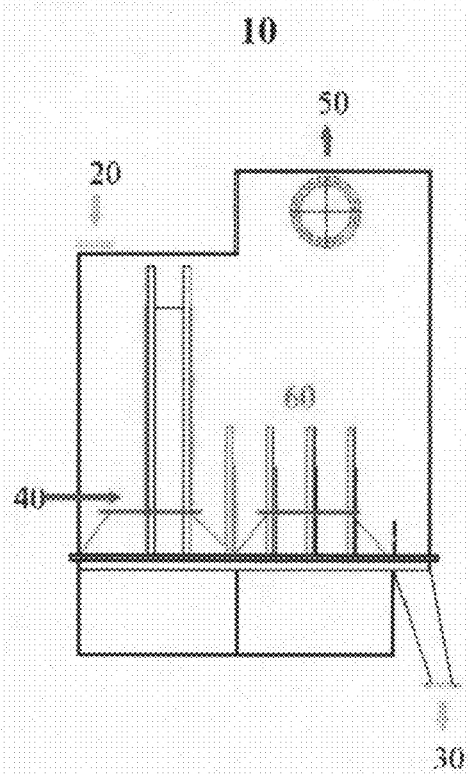
FIG. 1B provides a front view of a modified precrystallizer for precrystallization of the PEN resin according to an embodiment of the invention.

Due to the presence of nucleating agents, a single stage crystallization can be done at a higher temperature between about 190° C. and about 230° C., compared to the usual temperature of less than 160° C. for methods involving devolatilization. In an embodiment of the invention, the fast crystallizing amorphous PEN chips are charged into a top entry (FIGS. 1A, 2A, and 3A; SINCO Engineering S.P.A, Tortona, Italy) or modified top entry (FIGS. 1B, 2B, and 3B; modified in-house at Futura Polyesters Ltd, Tamilnadu, India) fluid bed crystallizer 1, 10, respectively, which operate with a stream of air/nitrogen heated to a temperature of between about 190° C. and about 230° C. to form precrystallized chips. The fluid bed-crystallizer 1, 10 comprises an amorphous chip inlet port 2, 20, an amorphous chip outlet port 3, 30, an inert gas inlet valve 4, 40, an inert gas outlet nozzle 5, 50, and vertical baffles 6, 60. The amorphous chips are charged into the fluid bed pre-crystallizer 1, 10 through the chip inlet port 2, 20. An inert hot gas, preferably nitrogen, is passed from the bottom valve 4, 40 and vented off from the top of the crystallizer via nozzle 5, 50. The pre-crystallizer is divided by vertical baffles 6, 60. Pre-crystallized chips are collected from chips outlet port 3, 30.

Referring again to FIGS. 1-3, hot nitrogen gas is distributed through out the pre-crystallizer 1, 10, which helps carry the chips through various baffles 6, 60. The vertical baffles 6, 60 maintain a continuous flow and control the residence time of the chips. The gas from the outlet nozzle 5, 50 is sent to suction pump where it is reheated and sent back to the pre-crystallizer 1, 10. The nitrogen pressure is maintained at about 0.1 bar and temperature at about 215-230° C. The residence time of the amorphous chips in the crystallizer is about 20-40 minutes.

Figure 2A:
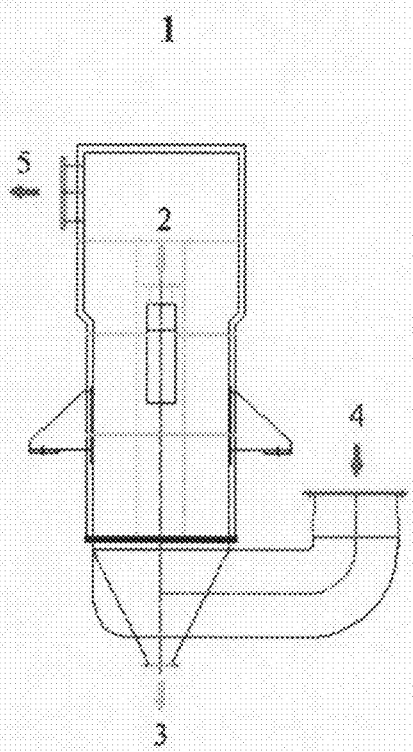
FIG. 2A provides a lateral view of a precrystallizer for precrystallization of the PEN resin according to an embodiment of the invention.
Figure 2B:
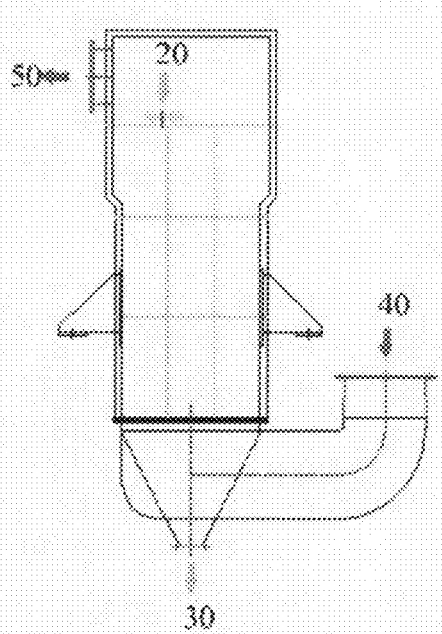
FIG. 2B provides a lateral view of a modified precrystallizer for precrystallization of the PEN resin according to an embodiment of the invention.

Referring now to FIGS. 2A, 2B, and 2C, the modified top entry fluid bed crystallizer 10 differs from the top entry design 1 in that the amorphous chip inlet port 20 is at the top. This modification increases the distance between the fluid-bed and amorphous chips, which in turn increases the exposure time of amorphous chips to fluid bed hot gas by increasing the residence time of the amorphous chips before they reach the fluid bed. This causes the PEN to become crystalline faster, compared to the conventional side entry crystallizers 1. The modification in the entry port 20 increases the distance between the chips and the fluid bed, which in turn increases the exposure of chips to hot gas. The time taken for pre-crystallizing the chips in an improved fluid bed crystallizer 10 is around 40 minutes, whereas the devolatilization process consumes about 10 hours. Thus, the improved fluid bed crystallizer 10 saves time and energy consumption. Due to this prior crystallization, SSP can be done at higher temperatures without the problem of sticking or lumping, thereby eliminating the lengthy devolatilization step.

In another embodiment, the methods of the invention further comprise the step of subjecting the precrystallized chips to SSP at about 240° C. to about 260° C. initially in the presence of nitrogen, for about 3 to about 5 hours, then releasing nitrogen pressure gradually and maintaining fine vacuum until the required I.V. is attained.

Practice of the invention will be still more fully understood from the following examples, which are presented herein for illustration only and should not be construed as limiting the invention in any way.

EXEMPLIFICATION

Example 1

Dimethyl 2,6-naphthalene dicarboxylate (NDC) and Monoethylene Glycol (MEG) are used in a 1:1.75 molar ratio. 14 kg of NDC and 7 kg of MEG are added to a batch reactor. To this mixture, 75 ppm sodium acetate, 300 ppm sodium benzoate, and 3000 ppm of nano clay are added as nucleating agents, 100 ppm manganese acetate is added as an ester interchange catalyst, and 25 ppm cobalt acetate is added as colorant. Esterification is carried out by progressively increasing the temperature to 225° C. and decreasing the pressure from about 1050 mbar to about 500 mbar for about 200 minutes, while simultaneously removing the by-product methanol. About 80% of the transesterifying step is carried out at about 1050 mbar followed by about 20% of the transesterifying step being carried out at about 500 mbar. After esterification, 100 ppm triethylphosphono acetate is added as a heat stabilizer and 250 ppm antimony trioxide ($Sb_2O_3$) is added as a polymerization catalyst and polymerization is conducted under progressive vacuum, from about 500 to about 2 mbar for about 45 minutes, increasing the temperature from about 250° C. to about 305° C. within that 45 minutes to create an amorphous PEN melt. The residence time of the PEN melt at 305° C. is kept brief, for about 35 minutes, in order to minimize degradation of the PEN melt while simultaneously take advantage of the increased rate of polymerization at this high temperature. The amorphous PEN melt is then extruded as a strand and cut into chips according to standard methods. The amorphous chips are then crystallized in a modified fluid bed crystallizer which has an inlet at the top rather than in the side, this modification increases the distance between the chips and the fluid bed, which in turn increases the exposure time of chips to hot gas. The amorphous chips are then crystallized by subjecting them to a temperature of about 225° C. in 0.1 bar nitrogen pressure for about 30 minutes. The crystallized chips are then subjected to SSP in a batch reactor by heating to about 260° C. under a stream of nitrogen for about 40 hours to increase the I.V. to about 1.0 dL/g.

The following table provides properties of the amorphous and SSP PEN resin modified with nucleating agents.

TABLE 1

Important characteristics of the PEN polymer of Example 1

| | I.V. (dL/g) | L* CIE Lab | a* CIE Lab | b* CIE Lab | COOH No. meq/kg | DEG (%) | $T_g$ °C. | $T_m$ °C. | $T_{cc}$ °C. | $T_{ch}$ °C. |
|---|---|---|---|---|---|---|---|---|---|---|
| AMORPHOUS PEN | ~0.56 | 68.1 | −1.2 | −3.3 | 27.0 | 0.79 | 123.8 | 266.2 | 127.2 | 195 |
| SSP PEN | 1.06 | 78.2 | −2.0 | 6.8 | — | — | — | — | — | — |

$T_g$ = glass transition temperature;
$T_m$ = melting point;
$T_{cc}$ = crystallization temperature while cooling from the melt;
$T_{ch}$ = crystallization temperature during the $2^{nd}$ heating cycle

Example 2

A 1:2 molar ratio of NDC:MEG, about 7.1 Kg of dimethyl 2,6-naphthalene dicarboxylate and 4.0 Kg of monoethylene glycol are placed into a batch reactor. About 3.7 g of manganese acetate is added in two equal parts (40 ppm+40 ppm as Mn), one part before esterification and other part in the middle of esterification, after about 30% distillation of methanol and about 0.02 g each of colorants like RT and BT (2.5 ppm) are added to the batch reactor. Esterification is carried out by increasing the temperature to about 255° C., decreasing the pressure to 750 mbar and simultaneously removing the by-product. About 80% of the transesterifying step is carried out at about 1050 mbar followed by about 20% of the transesterifying step being carried out at about 750 mbar The process time for esterification is about 260 minutes.

After esterification, 2.4 g of polymerization catalyst antimony trioxide (200 ppm as Sb) and about 5.07 g (100 ppm as P) of triethylphosphono acetate is added. Polymerization is conducted at about 250° C. to about 305° C. under vacuum for about 90 minutes in two stages. In the initial stage the temperature is raised from about 250 to about 285° C. for 70 minutes and in the final stage the temperature is raised from about 285 to about 305° C. for 20 minutes. Both the stages are carried out in complete vacuum. The residence time of the PEN melt at 305° C. is maintained to be minimum. The amorphous melt of PEN is then extruded as a strand and cut into chips.

The amorphous chips are then crystallized in the modified fluid bed crystallizer, which has an inlet at the top rather than in the side, which increases the distance between the chips and the fluid bed, which in turn increases the exposure of chips to hot gas. The crystallizer is fed at about 215° C. Thus a devolatilization process is avoided.

The crystallized chips are then subjected to SSP in a batch reactor by heating to 260° C. initially in the presence of nitrogen, for about 4 hours, then nitrogen pressure is released gradually and maintain in a fine vacuum to increase the IV.

Example 3

In this example, the resin composition is similar to that of Example 2 except for the addition of about 28 g (2800 ppm) of nucleating agent Nyacol® (Nanotechnologies Inc., USA) before esterification in the reactor. Esterification and polymerization are carried out under similar temperature and pressure. The total time taken for esterification is about 260 minutes and polymerization is about 85 minutes. The amorphous polymer is extruded under nitrogen pressure and collected as pellets.

Example 4

In this Example, the resin composition is similar to that of Example 2 except for the addition of about 4 g (400 ppm) of nucleating agent sodium benzoate before esterification in the reactor. Esterification and polymerization are carried out under similar temperature and pressure. The total time taken for esterification is about 260 minutes and polymerization is about 90 minutes. The amorphous polymer is extruded under nitrogen pressure and collected as pellets.

Example 5

A 1:1.75 molar ratio of NDC and MEG, about 14 Kg of dimethyl 2,6-naphthalene dicarboxylate and 7 Kg of monoethylene glycol are mixed in an esterification reactor. About 2.6 g of manganese acetate (20 ppm and 20 ppm as Mn), about 0.2 g each of colorants RT and BT (1.5 ppm, each) and about 1.2 g of cobalt acetate (20 ppm as Co) colorant are added to the above said mixture. The esterification reaction is carried out at about 245° C. for about 220 minutes in a pressure of about 500 mbar. About 80% of the transesterifying step is carried out at about 1050 mbar followed by about 20% of the transesterifying step being carried out at about 500 mbar.

After esterification, about 4.01 g of $Sb_2O_3$ (220 ppm as Sb), about 15.2 g (150 ppm as P) of thermal stabilizer triethylphosphono acetate (TEPA) and about 3.7 g (150 ppm as Sn) of polymerization catalyst butylstannoic acid are added. Polymerization is conducted at about 250 to about 305° C. under vacuum for about 70 minutes in two stages, as described in Example 2. After reaching the required molecular weight, about 1800 ppm of Aclyn 285 (25.2 g) is added and allowed to interact with the melt at about 305° C. with a pressure of about 1 mbar for about 20 minutes. The amorphous melt of PEN is then extruded out as a strand and cut into chips.

The amorphous chips are then crystallized in the improved fluid bed crystallizer by subjecting it to about 225° C. The crystallized chips are then subjected to SSP at about 260° C. initially in the presence of nitrogen, for about 4 hours, then nitrogen pressure is released gradually and maintain fine vacuum until the required I.V. is attained, bypassing the devolatilization process.

TABLE II

Resin composition in the Examples

| Ingredients | Example 1 | Example 2 | Example 3 | Example 4 | Example 5 |
|---|---|---|---|---|---|
| Batch weight, Kg | 14 | 10 | 10 | 10 | 14 |
| NDC & MEG, Molar Ratio | 1:1.75 | 1:2 | 1:2 | 1:2 | 1:1.75 |
| Manganese acetate, g | 6.4 | 3.7 | 3.7 | 3.7 | 2.6 |
| $Mn(OAc)_4$, ppm as Mn | 100 | 40 + 40 | 40 + 40 | 40 + 40 | 20 + 20 |
| $Sb_2O_3$, g | 4.2 | 2.4 | 2.4 | 2.4 | 4.0 |
| Sb, ppm as Sb | 250 | 200 | 200 | 200 | 240 |
| Cobalt Acetate, g | 1.5 | — | — | — | 1.2 |
| $Co(OAc)2$, ppm as Co | 25 | — | — | — | 20 |
| RT/BT (Red and Blue Toners), g | — | 0.02 | 0.02 | 0.02 | 0.02 |
| RT/BT, ppm as such | — | 2.5 | 2.5 | 2.5 | 1.5 |
| TEPA, g | 10.1 | 5.07 | 5.07 | 5.07 | 15.2 |
| TEPA, ppm as P | 100 | 70 | 70 | 70 | 150 |
| Butylstannoic acid, g | — | — | — | — | 3.7 |
| Sn, ppm as Sn | — | — | — | — | 150 |
| Sodium acetate, g | 1.05 | | | | |
| Sodium acetate, ppm as such | 75 | | | | |
| Nanoclay, g | 42 | — | — | — | — |
| Nanoclay, ppm as such | 3000 | — | — | — | — |
| Nyacol, g | — | — | 28 | — | — |
| Nyacol, ppm as such | — | — | 2800 | — | — |
| Sodium benzoate, g | 4.2 | — | — | 4 | — |
| Sodium benzoate, ppm as such | 300 | — | — | 400 | — |
| Aclyn 285, g | — | — | — | — | 25.2 |
| Aclyn 285, ppm as such | — | — | — | — | 1800 |

TABLE III

Important characteristics of the amorphous PEN polymer

| S. No | IV dL/g | Carboxyl number meq/kg | DEG % | L* CIE | a* CIE | b* CIE | $T_g$° C. | $T_m$° C. | $T_{ch}$° C. |
|---|---|---|---|---|---|---|---|---|---|
| 2 | 0.527 | 14 | 0.64 | 62.3 | −0.7 | −1.1 | 123 | 267 | 219 |
| 3 | 0.529 | 19 | 0.92 | 62 | −1 | −2 | 122 | 267 | 193 |
| 4 | 0.486 | 20 | 1.03 | 65 | −2.8 | 2.9 | 123 | 267 | 203 |
| 5 | 0.523 | 20 | 0.74 | 60.9 | −3.3 | 4 | 124 | 269 | 198 |

In Example 5, the addition of manganese acetate and cobalt acetate has reduced the esterification time to 220 minutes. Similarly addition of butylstannoic acid and antimony trioxide, the polymerization catalyst has reduced the polymerization time to 70 minutes.

In Example 3, the carboxyl number is 19 and $T_{ch}$ is 193° C. These two factors are the main reasons for faster rate of crystallization of PEN chips.

In Examples 4 and 5, the carboxyl number is 20. The two stage polymerization reaction has increased the carboxyl number. This increased carboxyl number in turn decreases the solid state polymerization time.

In Examples 4 and 5, $T_{ch}$ is about 203° C. and about 198° C., respectively. The decreased crystallization temperature decreases the crystallization time which is evident from Table III. The amorphous PEN resin is heated to about 180° C. in an oven and samples are taken at different time intervals. The crystallinity of these samples is measured in a density gradient and given in the following table.

TABLE IV

Rate of Crystallization at 180° C.

| | | Crystallinity, % | | | |
|---|---|---|---|---|---|
| S. No | Time, min | Eg 2 | Eg 3 | Eg 4 | Eg 5 |
| 1. | 20 | 23.85 | 27.02 | 28.11 | 26.85 |
| 2. | 60 | 26.12 | 29.42 | 30.29 | 30.25 |
| 3. | 100 | 27.22 | 32.22 | 33.74 | 30.01 |

The rate of crystallization is found to be higher for Example 4. This increase may be due to the addition of nucleating agent sodium benzoate during the esterification reaction. The percentage crystallinity is comparatively high for Example 3 which is attributed to the presence of nucleating agent Nyacol®. The rate of crystallization is less for Example 2, due to the absence of nucleating agents.

Thus modified PEN (Example 3, 4, and 5) with lower crystallization temperature crystallizes faster than standard PEN (Example 2).

The amorphous PEN pellets are charged into an improved fluid bed crystallizer from the top as shown in the FIG. 1. This crystallizer operates with a stream of nitrogen heated to a temperature of about 225° C. in about 0.1 bar nitrogen pressure for about 40 minutes. The crystallized chips are then subjected to SSP in a batch reactor by heating to about 260° C., initially in the presence of nitrogen, then releasing nitrogen pressure gradually and maintaining fine vacuum till required I.V. is attained. Since the chips are pre-crystallized for about 30 minutes in an improved fluid bed crystallizer it saves about 10 hours of devolatilization process. Moreover this fast crystallizing PEN reduces the SSP time to a greater extend.

INCORPORATION BY REFERENCE

The contents of all cited references (including literature references, patents, patent applications, and websites) that maybe cited throughout this application are hereby expressly incorporated by reference. The practice of the present invention will employ, unless otherwise indicated, conventional techniques of polymer chemistry, which are well known in the art.

EQUIVALENTS

The invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims rather than by the foregoing description, and all changes that come within the meaning and range of equivalency of the claims are therefore intended to be embraced herein.

We claim:

1. A method of making a rapidly crystallizable amorphous polyethylene naphthalate (PEN) polymer, the method comprising the steps of: (a) transesterifying dimethyl 2,6-naphthalene dicarboxylate (NDC) in the presence of (i) monoethylene glycol (MEG); (ii) at least one transesterification catalyst; and (iii) at least one nucleating agent, wherein about 80% of the transesterifying step is carried out at about 1050 mbar followed by about 20% of the transesterifying step being carried out at about 500 mbar, to form a prepolymer; and (b) polymerizing the prepolymer at about 250° C. to about 305° C. in the presence of a polymerization catalyst and at least one thermal stabilizer.

2. The method according to claim 1, wherein about 80% of the transesterifying step is carried out at atmospheric pressure.

3. The method according to claim 1, wherein about 20% of transesterifying step is carried out by decreasing the pressure to about 500 mbar.

4. The method according to claim 1, wherein about 80% of the transesterifying step is carried out at about 1050 mbar followed by about 20% of the transesterifying step being carried out at about 500 mbar at a temperature of about 230° C. to about 255° C.

5. The method according to claim 1, wherein manganese acetate is added as a transesterification catalyst.

6. The method according to claim 5, wherein the manganese acetate is added at about 35 ppm to about 150 ppm as Mn.

7. The method according to claim 1, wherein transesterification catalyst is added at the start of the transesterifying step and in the middle of the transesterifying step.

8. The method according to claim 1, wherein methanol is removed during the transesterifying step.

9. The method according to claim 1, wherein the nucleating agent is selected from the group consisting of a sodium, a sorbitol, or a nano particle containing compound.

10. The method according to claim 1, wherein the nucleating agent is selected from the group consisting of sodium acetate, sodium benzoate, nano clay, nano particles, micronized sorbitol, sodium salicylates, NYACOL®, sodium sorbitrate, nano silica, tungsten trioxide, 3,5-di-t-butyl-4-hydroxyphenyl propionic acid methyl ester, ethylene acrylic acid sodium ionomer, and a combination thereof.

11. The method according to claim 1, wherein the nucleating agent is selected from the group consisting of sodium acetate, sodium benzoate, nano clay, or a combination thereof.

12. The method according to claim 10, wherein sodium acetate is added at about 2 ppm to about 200 ppm.

13. The method according to claim 10, wherein sodium acetate is added at about 10 ppm to about 150 ppm.

14. The method according to claim 10, wherein sodium benzoate is added at about 100 ppm to about 1000 ppm.

15. The method according to claim 10, wherein sodium benzoate is added at about 200 ppm to about 800 ppm.

16. The method according to claim 10, wherein nano clay is added at about 100 ppm to about 3000 ppm.

17. The method according to claim 10, wherein NYACOL® is added at about 1000 ppm to about 4000 ppm.

18. The method according to claim 10, wherein NYACOL® is added at about 2500 ppm to about 3000 ppm.

19. The method according to claim 1, wherein the nucleating agent is added in the range of about 10 ppm to about 4000 ppm.

20. The method according to claim 1, wherein the nucleating agent is added in the range of about 20 ppm to about 3500 ppm.

21. The method according to claim 1, further comprising the step of adding Aclyn 285 as a nucleating agent after polymerization.

22. The method according to claim 1, wherein a thermal stabilizer is added after the transesterifying step.

23. The method according to claim 1, wherein a thermal stabilizer is added at about 40 ppm to about 200 ppm.

24. The method according to claim 1, wherein a thermal stabilizer is added at about 60 ppm to about 150 ppm.

25. The method according to claim 1, further comprising the step of extruding the PEN melt into strands in water and then cutting them into chips.

26. The method according to claim 25, further comprising the step of crystallizing the chips in a fluid bed crystallizer at about 190° C. to about 230° C. to form precrystallized chips.

27. The method according to claim 25, further comprising the step of crystallizing the chips in a fluid bed crystallizer at about 220° C. to about 230° C. to form precrystallized chips.

28. The method according to claim 27, wherein the fluid bed crystallizer is a top entry crystallizer.

29. The method according to claim 27, wherein the fluid bed crystallizer is a modified top entry crystallizer.

30. The method according to claim 25, further comprising the step of subjecting the precrystallized chips to solid state polymerization (SSP) at about 240° C. to about 260° C. initially in the presence of nitrogen for about 4 hours, then releasing nitrogen pressure gradually and maintaining a fine vacuum until the required I.V. is attained.

31. An amorphous polyethylene naphthalate (PEN) polymer made by the method of claim 1.

* * * * *